United States Patent [19]

Sakayori et al.

[11] Patent Number: 4,788,022
[45] Date of Patent: Nov. 29, 1988

[54] METHOD OF MANUFACTURING WATERPROOF NUTS

[75] Inventors: Kiyoshi Sakayori, Kodaira; Shinichi Iwasaki, Musashino; Yozo Ishida, Higashimurayama; Toshikazu Shinogaya, Kodaira; Yuzo Ishizuka, Shiki, all of Japan

[73] Assignee: Bridgestone Corp., Tokyo, Japan

[21] Appl. No.: 92,623

[22] Filed: Sep. 3, 1987

Related U.S. Application Data

[62] Division of Ser. No. 830,867, Feb. 19, 1986, abandoned.

[30] Foreign Application Priority Data

Feb. 22, 1985 [JP] Japan .................................. 60-34176
Sep. 17, 1985 [JP] Japan ................................ 60-204938
Jul. 5, 1987 [JP] Japan ................................ 60-148052

[51] Int. Cl.⁴ ...................... B29C 45/00; B21D 53/24
[52] U.S. Cl. ................................ 264/275; 10/86 R; 10/86 C; 264/310; 264/328.9
[58] Field of Search .......................... 10/86 R, 86 C; 264/DIG. 64, 259, 271.1, 318, 328.16, 275, 310, 328.9; 411/377, 429, 431, 907

[56] References Cited

U.S. PATENT DOCUMENTS

| | | | |
|---|---|---|---|
| 1,904,263 | 4/1933 | Berge | 411/135 |
| 2,018,301 | 10/1935 | Ferry | 411/430 |
| 2,795,144 | 6/1957 | Morse | 411/431 X |
| 4,316,690 | 2/1982 | Voller | 411/377 |
| 4,373,842 | 2/1983 | Bettini et al. | 411/377 |
| 4,397,437 | 8/1983 | Madej | 411/431 |
| 4,446,185 | 5/1984 | Waragai et al. | 411/907 X |
| 4,452,556 | 6/1984 | Nelson et al. | 411/377 |
| 4,482,278 | 11/1984 | Dorn | 411/377 |
| 4,557,654 | 12/1985 | Masuda et al. | 411/907 |

FOREIGN PATENT DOCUMENTS

| | | | |
|---|---|---|---|
| 1275038 | 9/1961 | France . | |
| 53-99261 | 8/1978 | Japan | 264/328.16 |
| 58-63428 | 4/1983 | Japan | 264/328.16 |
| 830722 | 3/1960 | United Kingdom . | |
| 1263548 | 2/1972 | United Kingdom . | |

*Primary Examiner*—E. Michael Combs
*Attorney, Agent, or Firm*—Parkhurst, Oliff & Berridge

[57] ABSTRACT

A waterproof nut which may be used, for example, inside a water storage tank, is constituted by a metallic nut body having the outer periphery coated with a synthetic resin layer which also covers both the front and rear surfaces of the nut body. The resin layer which covers the rear surface of the nut body includes a cap-shaped portion for accommodating the free end of a bolt which is screwed into the nut body in such a manner that the free end projects from the rear surface of the nut body, whereby water is prevented from entering the nut body.

15 Claims, 4 Drawing Sheets

METHOD OF MANUFACTURING WATERPROOF NUTS

This is a division of application Ser. No. 830,867 filed Feb. 19, 1986 abandoned.

BACKGROUND OF THE INVENTION

1. Field of the Invention

The present invention relates to a waterproof nut which may be used, for example, inside a water storage tank, and more particularly to a waterproof nut which may be employed in conditions in which it comes into contact with water or in which a liquid that may produce condensation is present, and which may also be used for a joint or the like in piping. The present invention also pertains to a method of manufacturing a waterproof nut of the type described above.

2. Description of the Related Art

One type of known water storage tank is constituted by panel units which are tightly joined together by means of nuts and bolts which are screwed and tightened thereon. Since the nuts and bolts employed in a high-humidity atmosphere, as in the case of a water storage tank, must be resistant to corrosion, it is general practice to subject such nuts and bolts to plating or chromating, or to make them of a stainless steel material or a synthetic resin material. These anticorrosion treatments, however, cannot prevent corrosion from chlorine gas generated from the water contained in the tank, and even nuts and bolts which are made of a stainless steel material are corroded by this chlorine gas. Nuts and bolts which are made of a synthetic resin material have insufficient mechanical strength for obtaining the desired level of performance, and are therefore unsatisfactory for industrial purposes.

There is a known method in which, after panel units have been fastened together by nuts and bolts, the nut and bolt assemblies are externally covered with caps made of a resin. This method, however, involves troublesome operations, and has the disadvantage that the caps may come off the nut and bolt assemblies during use.

To overcome these disadvantages, the applicant of the present invention has already proposed an improved waterproof nut (see Japanese Utility Model Laid-Open No. 99998/1984). The structure of his waterproof nut is shown in FIG. 10. More specifically, a cap nut body 20 which has a cap-shaped portion 21 is employed. The surface of the cap-shaped portion 21 is machined so that projections and recesses are formed thereon, and is then coated with a synthetic resin layer 22. This proposed prior art has already been widely used as a nut for, in particular, water storage tanks.

This type of nut, however, necessitates a complicated manufacturing process, which leads to an increase in the production cost. More specifically, the formation of the cap nut body 20 requires much more time and labor than ordinary nut bodies, so that the production cost of the former can be at least ten times that of the latter.

The necessity of providing the cap-shaped portion 21 on the nut body 20 will be explained below.

The nut of the above-described type is generally produced by setting the cap nut body 20 in a mold and charging a synthetic resin into the mold. In this case, if an ordinary nut body with no cap-shaped portion 21 is employed, a core which has the same configuration as that of the bolt which is to be screwed into the completed nut is screwed into the nut body, and the nut body is set in the mold in this state. The synthetic resin is then charged, and, after the resin has hardened, the core is unscrewed from the nut body which is still in the mold.

In this process, it is impossible to prevent the charged synthetic resin (liquid) from entering the small space defined between the nut body and the threaded portion of the core, but any resin in that small space makes it extremely difficult to unscrew the core from the nut body. In order to solve this problem, the cap-shaped portion 21 is formed on the nut body 20, and the synthetic resin is thereby prevented from entering the small space.

In addition, since the inner diameter of the synthetic resin portion is inevitably reduced by mold shrinkage, the thread engagement area between the nut and a bolt may become so tight that the nut cannot be smoothly screwed onto the bolt, which means that the working efficiency of the fastening operation is greatly reduced, and it is not possible to obtain the required clamping force.

SUMMARY OF THE INVENTION

In view of the above-described circumstances, it is an object of the present invention to provide a waterproof nut coated with a synthetic resin, by employing an ordinary nut body.

The present invention provides a waterproof nut comprising a nut body and a synthetic resin layer which covers it, the resin layer covering both the nut body and the front surface thereof as well as defining a cap-shaped portion over the rear surface thereof, the cap-shaped portion accommodating the free end of a bolt which is screwed into the nut.

It is another object of the present invention to provide a method of manufacturing a waterproof nut of the type described above.

According to the method of the present invention, a core in the form of a bolt is screwed into a nut body from the front surface thereof in such a manner that the free end of the core projects from the rear surface of the nut body. In this case, the nut body has an inner diameter which is 0.05 to 0.4 mm larger than the nominal diameter thereof, and the threaded portion of the core has an outer diameter which is 0.02 to 0.1 mm larger than the nominal diameter of the nut body. The engaged nut body and the core are set in a mold which has a section for forming a synthetic resin outer layer which covers the outer periphery of the nut body, another section for forming a front surface covering layer which covers the front surface of the nut body and still another section for forming a cap-shaped portion which covers the rear surface of the nut body. Synthetic resin is then charged into the mold in a state such that the temperature of the nut body and the core is lower than the ordinary molding temperature, and the resin is hardened. Thereafter, the core is unscrewed from the nut body, and a cap-shaped portion is formed over the rear surface of the nut body.

One of the features of the waterproof nut according to the present invention resides in the arrangement wherein the nut body is covered with a synthetic resin layer even over the front surface thereof. The synthetic resin layer portion covering the front surface prevents the nut body from being separated or removed from the synthetic resin layer when the nut is tightened. This resin layer portion may have a characteristic configuration, such as described later. Another feature of the waterproof nut resides in the cap-shaped portion of a synthetic resin which covers the rear surface of the nut body, the cap-shaped portion being of a size which enables it to accommodate the free end of a bolt which is screwed into the nut. The outer periphery of the cap-shaped portion may be made cylindrical or it may be polygonal, e.g., hexagonal, so that this portion can be held when the nut is tightened.

It is generally considered that the temperature of the mold and the nut body, etc., should be set at a relatively high level during the process of charging the synthetic resin into the mold. With the present invention, therefore, the temperature of the mold itself and the nut body, etc., can generally be about 70° to 100° C. if using a resin such as a polyamide resin (nylon 6,6), although this temperature depends upon the kind of synthetic resin employed. However, according to the present invention, the temperature of the nut body and the core is restricted to within a temperature range lower than that mentioned above, and the molding process is carried out at about 5° to 45° C.

In addition, it is generally recommended that, when molding synthetic resin by injection molding or other similar molding process, the mold and the core should be at a temperature which is as high as possible, from the overall viewpoint of the quality and external appearance of the product. This is because it is necessary to smoothen the flow and hardening rate of the resin charged into the mold. However, the method according to the present invention makes good use of this practice. More specifically, since it is not preferable that the charged resin flows through the gap between the nut body and the core, the mold and the core are held at a relatively low temperature so that the resin is prevented from entering the gap.

Experiments have showed that when a nylon resin was employed and the temperature of the nut body was set at 80° C., a relatively large amount of resin entered the gap between the nut body and the core, and it was therefore difficult to unscrew the core from the nut body. According to the present invention, however, the core and the nut body are held within the aforementioned relatively low temperature range, so that only an extremely small amount of resin is able to enter the gap, thus facilitating the unscrewing of the core. In addition, the outer diameter of the core and the inner diameter of the nut body are specified as appropriate, to allow for shrinkage of the resin.

It is preferable that the external thread ridge formed on the bolt which is screwed into the waterproof nut and the internal thread ridge formed on the cap-shaped portion of the nut should be in contact with each other to a certain extent, to increase the mechanical strength of the nut and bolt assembly. The dimension by which the thread ridges are in contact should be set to 0.4 to 1.4 mm, preferably 0.7 to 1.2 mm, in order to obtain an increased mechanical strength and excellent thread engagement.

From the above-described point of view, the dimensions of the core should be selected so that the dimension of the internal thread ridge of the cap-shaped portion is within the aforementioned range. The outer periphery of the cap-shaped portion may be cylindrical, but it is preferably polygonal, e.g., hexagonal, so that this portion can be held when the nut is tightened.

The kind of synthetic resin employed by the present invention is not necessarily limited; it is possible to select any kind of resin which satisfies the strength requirements (for example, when the nut is tightened). Examples include various kinds of synthetic resin, such as polyamide, ester, ether, sulfone and sulfide resins, and more particularly, nylon 6,6, nylon 6, polyethylene terephthalate, polybutylene terephthalate, polycarbonate, polyphenylene oxide, polyoxymethylene, polyether sulfone, polysulfone, polyphenylene sulfide, etc. However, the present invention is, of course, not necessarily limited to the above-mentioned resins.

The selected synthetic resin is melted to form a liquid and is charged into the mold. During this time, the mold and the core are held at an appropriate temperature which depends upon the resin employed. That temperature is generally 70° to 100° C. for a polyamide resin, 60° to 100° C. for an ester resin, 70° to 100° C. for an ether resin, 140° to 180° C. for a sulfone resin, or 110° to 150° C. for a sulfide resin. In the present invention, however, it is necessary to charge the resin in a state wherein the core and the nut body are held at a temperature which is considerably lower than the corresponding temperature range mentioned above. It is preferable that the temperature should be 50° C. or less (preferably 25° to 45° C.) for a polyamide resin, 60° C. or less (preferably 25° to 45° C.) for an ester resin, 55° C. or less (preferably 25° to 45° C.) for an ether resin, 110° C. or less (preferably 25° to 100° C.) for a sulfone resin, or 110° C. or less (preferably 5° to 100° C.) for a sulfide resin.

Of the above-mentioned resins, a polyamide resin (a nylon resin) is most preferable from the overall viewpoint of availability, cost and strength. In addition, it is possible to mix a filler or the like into the resin employed, according to need. For example, glass fibers, carbon fibers, milled fibers, or aramid fibers, may be employed.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which.

DESCRIPTION OF THE PREFERRED EMBODIMENTS

Figure 1:
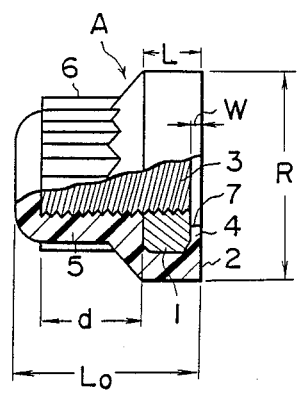
FIG. 1 is a partially-cutaway side view of one embodiment of the waterproof nut according to the present invention.
Figure 2:
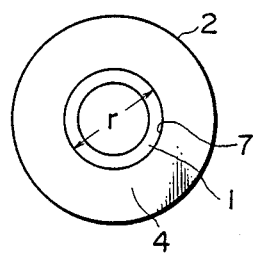
FIG. 2 is a side view of the waterproof nut shown in FIG. 1, as viewed from the right-hand side thereof.
Figure 3:
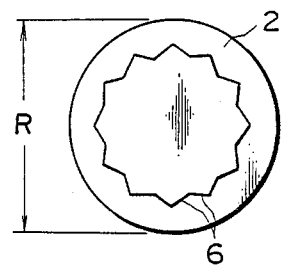
FIG. 3 is a side view of the waterproof nut shown in FIG. 1, as viewed from the left-hand side thereof.

Referring first to FIGS. 1 to 3 which show in combination a waterproof nut A in accordance with one embodiment of the present invention, a nut body 1 is coated with a nylon resin layer 2. The nut body 1 has a hexagonal outer periphery, and an internal thread 3 is cut in the inner peripheral surface of the nut body 1. The nylon resin layer 2 is provided so as to form a front surface covering layer or lip 4 which covers the front surface of the nut body 1 and a cap-shaped portion 5 which covers the rear surface of the nut body 1.

The cap-shaped portion 5 is of a size which enables it to accommodate the free end of a bolt (not shown) when screwed thereinto. The inner peripheral surface of the cap-shaped portion 5 may be provided with an internal thread which is contiguous with the internal thread 3 cut in the inner peripheral surface of the nut body 1. The outer periphery of the cap-shaped portion 5 may be shaped so that it can be held when the nut is tightened. In the illustrated example, a multiplicity of small projections 6 having a triangular cross-section are formed on the outer periphery of the cap-shaped portion 5.

Figure 4:
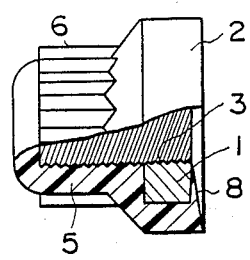
FIG. 4 is a partially-cutaway side view of another embodiment of the waterproof nut according to the present invention.

The inner end of the lip 4 preferably defines a step 7 as shown in FIG. 1, or the thickness of the lip 4 may be gradually reduced toward the internal thread 3 so as to provide a taper portion 8 as shown in FIG. 4, in order to accurately and effectively position a packing material (not shown) which may be used when the nut is screwed onto a bolt. If neither the step 7 nor the taper portion 8 is provided, when the nut is tightened, the packing material may be pressed outwardly to damage the external appearance considerably.

Figure 5:
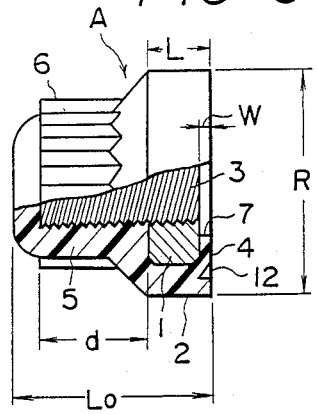
FIG. 5 shows a modification of the waterproof nut according to the present invention which has a ring-shaped groove in the front surface thereof.
Figure 6:
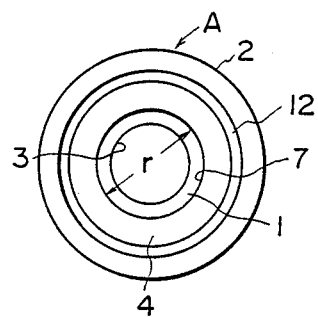
FIG. 6 is a side view of the waterproof nut shown in FIG. 5, as viewed from the right-hand side thereof.
Figure 7:
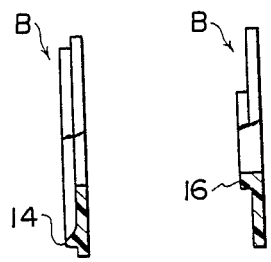
FIGS. 7(a) and 7(b) are sectional views showing washers which may be engaged with the waterproof nuts shown in FIGS. 5 and 1, respectively.

FIGS. 5 and 6 show in combination a nut A which has a ring-shaped groove 12 formed in the front surface of the lip 4. A washer B which is shown in FIG. 7(a) is engaged with the groove 12. The washer B has a ring-shaped projection 14 which is fitted into the groove 12, so that the nut A and the washer B are connected together in one unit and are prevented from separating from each other. The outer diameter of the projection 14 is preferably made slightly larger than the largest diameter of the groove 12.

The washer B shown in FIG. 7(b) is provided with a projection 16 which is fitted to the step 7 of the nut A shown in FIG. 1. This washer B is snap-fitted into the nut A in the same manner as in the case of the washer B shown in FIG. 7(a).

In the illustrated example, the nut body 1 is an M12 hexagon nut, in which: the diameter R of the largest-diameter portion, including the nylon resin layer 2, is 30 mm; the inner diameter r of the lip 4 is 14 mm; the length L of the portion whose diameter is R is 7 mm; and the thickness W of the lip 4 is 1 to 3 mm. The substantial diameter of the cap-shaped portion 5 which covers the rear surface of the nut body 1 is 18.9 mm, and twelve projections 6 having a triangular cross-section are continuously formed on the outer periphery of the cap-shaped portion 5, the height of the projections 6 being 1 mm.

The depth d of the cap-shaped portion 5 is 15 mm, and the inner peripheral surface of the cap-shaped portion 5 is provided with an internal thread which is contiguous with the internal thread formed on the inner peripheral surface of the nut body 1. The overall length $L_o$ of the waterproof nut A is 27 to 29 mm. These dimensions, as a matter of course, differ depending upon conditions in which the nut A is used, and performance requirements, and the kind and thickness of resin employed and the type of nut body may be selected as desired in accordance with the use conditions and performance requirements.

Figure 8:
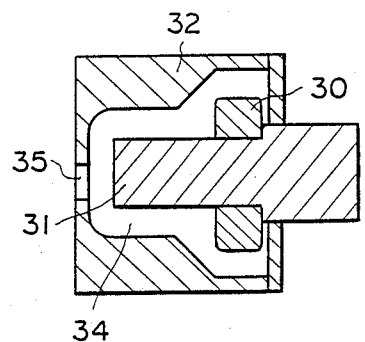
FIG. 8 is a sectional view of a mold, a core and a nut body which are set in the mold, showing an example of the method of manufacturing a waterproof nut according to the present invention.
Figure 9:
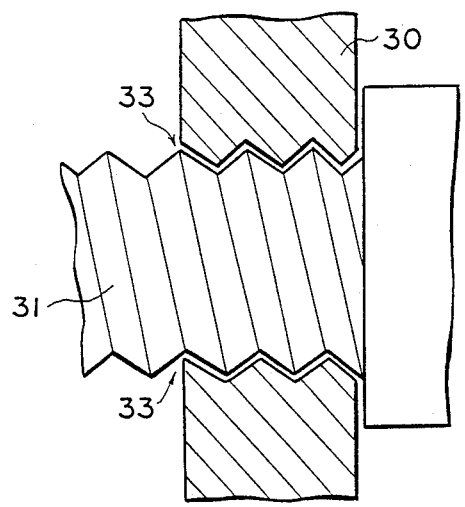
FIG. 9 is an enlarged sectional view of an essential portion of the engaged core and the nut body shown in FIG. 8.
Figure 10:
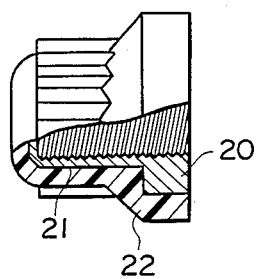
FIG. 10 is a partially-cutaway side view of a conventional waterproof nut.

FIGS. 8 and 9 are sectional views which show in combination the positional relationship between a mold 32, a nut body 30 and a core 31 in manufacturing the waterproof nut according to the present invention. A synthetic resin, e.g., nylon 6,6, is heated at about 270° C. to 280° C. and thereby melted in advance and is charged into the mold 32 through a small bore 35 provided therein. The outer diameter of the core 31 must be strictly determined, since it strongly influences the clamping property of the waterproof nut completed. Since the synthetic resin shrinks after it has been molded, the outer diameter of the core 31 is set so as to be 0.02 to 0.1 mm larger than the nominal diameter of the nut body 30, preferably 0.04 to 0.06 mm larger than the latter in order that the amount of contact between the internal thread ridge of the cap-shaped portion formed of the synthetic resin and the external thread ridge of the bolt which is screwed into the nut is within a desired range.

The nut body 30 is mainly made of a metal. Since it is screwed onto the core 31 in the form of a bolt, the nut body 30 is over-tapped so that the inner diameter thereof is slightly larger than the nominal diameter by about 0.05 to 0.4 mm in general, preferably about 0.1 to 0.3 mm. However, if the nut body 30 is excessively over-tapped, it undesirably becomes easy for the synthetic resin to enter the gap between the engaged core 31 and the nut body 30 when the resin is charged.

As to the kind of synthetic resin which is to be charged, it is preferable to employ a nylon resin among the aforementioned resins from the viewpoint of availability and strength. In addition, a filler or the like may be added according to need, and the mixing ratio of a filler is preferably 10 to 60%, more preferably 30 to 50%, from the overall viewpoint of reinforcing effect, external appearance and moldability.

In a practical example of the method of manufacturing the waterproof nut according to the present invention, a core 31 having a length of 25 mm and an outer diameter of 12.05 mm (the nominal diameter +0.05 mm) was employed, and the inner peripheral surface of the nut body 30 was over-tapped so that the inner diameter thereof was 0.2 mm larger than the nominal diameter, the nut body 30 having been subjected to deposition so that the deposit thickness is 20 m.

The core 31 was inserted into a cavity 34 in the mold 32 which had the same configuration as the external shape of the waterproof nut, and the core 31 was fixedly set. Then, nylon 6,6 (containing 40% of short glass fibers) was injected into the cavity 34 by an injection molding machine (not shown).

According to experiments, when the temperature of the mold 32, the core 31, etc., was 80° C. or more, the resin undesirably entered and completely filled up the small space 33 between the nut body 30 and the core 31, so that it was impossible to unscrew the core 31 from the nut body 30. However, it was possible to prevent the resin from entering the small space 33 by charging the resin in a state wherein the temperature of the mold 32 and the core 31 was controlled so as to be 50° C. or less. When the mold temperature was 45° C. or less, it was particularly easy to unscrew the core 31 from the nut body 30.

The strength of the waterproof nut thus obtained was measured by variously changing the amount of contact between the internal thread ridge of the cap-shaped portion and the external thread ridge of the bolt screwed into the nut. More specifically, waterproof nuts which were different from each other in terms of the thread diameter of the cap-shaped portion were obtained by properly selecting the diameter of the threaded portion of the core 31, and then a marketing M12 bolt which had been subjected to electroplating was screwed into each of the waterproof nuts. Table 1 shows the thread ridge contact amount and the breaking torque strength of each of the waterproof nuts. Examples 1 to 3 allowed the bolt to be smoothly and effectively screwed thereinto, but Example 4 was slightly tight for the bolt as compared with Examples 1 to 3. However, all of them had a satisfactorily high strength and were able to endure easily an ordinary clamping operation with an impact wrench. Example for comparison had a contact amount of 0 mm, which means that the bolt was in thread engagement with the nut body alone. In consequence, the breaking torque strength is extremely low, and this waterproof nut cannot be practically used.

TABLE 1

|  | Example 1 | Example 2 | Example 3 | Example 4 | Example for comparison |
|---|---|---|---|---|---|
| Contact amount (mm) | 0.5 | 0.8 | 0.9 | 1.2 | 0 |
| Breaking torque strength (kg · cm) | 600 | 900 | 1100 | 720 | 350 |

Table 2 shows the results of a vibration test carried out on the waterproof nut of the present invention. In this test, after members to be joined had been fastened together with an axial force of 1.5 ton, sine-wave vibrations with an amplitude of ±1.0 mm were applied in a direction perpendicular to the axial direction of the nut and bolt assembly, and the residual axial force was examined after the nut and bolt assembly had been vibrated 1,000 times.

TABLE 2

|  | Examples for comparison | | | Example 5 |
|---|---|---|---|---|
|  | SUS 304 | Titanium | SS 41 | Resin nut and bolt |
| Residual axial force $Q_z$ (ton) | 0.05 | 0 | 0.35 | 0.93 |
| Residual axial force ratio $Q_z/Q_0$ (%) | 3 | 0 (bolt broken) | 23 | 62 |

The head of the bolt employed in Example 5 is coated with nylon.

As will be clearly understood from Table 2, the nut and bolt assembly which includes the waterproof nut according to the present invention is less than the metallic nut and bolt assemblies in terms of the degree of looseness brought about by the vibration and has a higher residual axial force ratio than those of the latter.

As has been described above, it is possible, according to the present invention, to economically produce a waterproof nut which can be smoothly and effectively screwed onto a bolt and has an advantageously large breaking strength. In addition, the waterproof nut according to the present invention is so designed that it is effectively prevented from loosening. Thus, the waterproof nut obtained by the present invention, together with a resin-coated bolt, can be used in food industry equipment, marine structures, chemical plants, vehicles and various other fields in which corrosion resistance is required, to say nothing of water storage tanks, and as a nut and bolt assembly which is resistant to loosening.

What is claimed is:

1. A method of manufacturing a waterproof nut, comprising the steps of:

screwing a threaded core into a threaded hole of a nut body from a front surface of the nut body in such a manner that a free end of said core projects from a rear surface of said nut body, the threaded hold of the nut body having an inner diameter sufficient to threadably accept a threaded bolt having a predetermined outer diameter, said core having an outer diameter which is larger than the predetermined outer diameter of the threaded bolt for screwing into the nut body, said threaded hole of said nut body having an inner diameter which is larger than the outer diameter of said core;

setting an assembly of the engaged nut body and core in a mold which has a first section for forming a synthetic resin outer layer which covers an outer periphery of said nut body, a second section for forming a front surface covering layer which covers the front surface of said nut body and a third section for forming a cap-shaped portion which covers the rear surface of said nut body;

charging molten polyamide resin into said mold while maintaining a temperature of said nut body and said core at 25° to 50° C., to prevent the molten resin from flowing into an annular clearance between said nut body and said core;

hardening said resin about the nut body and the free end of said core to form the cap-shaped portion at the rear surface of the nut; and unscrewing said core from said out body to form an internal threaded hole in said cap-shaped portion.

2. A method according to claim 1, wherein an outer periphery of said cap-shaped portion is made non-circular.

3. A method according to claim 1, wherein said front surface covering layer covers the front surface of said nut body except for the threaded hole in which an internal thread is formed.

4. A method according to claim 1, wherein an inner end of said front surface covering layer defines a step.

5. A method according to claim 1, wherein said internal threaded hole in said cap-shaped poriton is coaxial with he internal threaded hole of said nut body to form an inner threaded poriton of said waterproof nut.

6. A method according to claim 1, wherein the temperature of the polyamide resin is 25° to 45° C.

7. A method of manufacturing a waterproof nut, comprising the steps of:

screwing a threaded core into a threaded hole of a nut body from a front surface of the nut body in such a manner that a free end of said core projects from a rear surface of said nut body, the threaded hole of the nut body having an inner diameter sufficient to threadably accept a threaded bolt having a predetermined outer diameter, said core having an outer diameter which is larger than the predetermined outer diameter of the threaded bolt for screwing into the nut body, said threaded hole of said nut body having an inner diameter which is larger than the outer diameter of said core;

setting an assembly of the engaged nut body and core in a mold which has a first section for forming a synthetic resin outer layer which covers an outer periphery of said nut body, a second section for forming a front surface covering layer which covers the front surface of said nut body and a third section for forming a cap-shaped poriton which covers the rear surface fo said nut body;

charging molten ester resin into said mold while maintaining a temperature of said nut body and said core at 25° to 60° C., to prevent the molten resin from flowing into an annular clearance between said nut body and said core;

hardening said resin about the nut body and the free end of said core to form the cap-shaped portion at the rear surface of the nut; and unscrewing said core from said out body to form an internal threaded hole in said cap-shaped portion.

8. A method according to claim 7, wherein the temperature of said nut body and said core is 25° to 45° C.

9. A method of manufacturing a waterproof nut, comprising the steps of:

screwing a threaded core into a threaded hole of a nut body from a front surface of the nut body in such a manner that a free end of said core projects from a rear surface of said nut body, the threaded hole of the nut body having an inner diameter sufficient to threadably accept a threaded bolt having a predetermined outer diameter, said core having an outer diameter which is larger than the predetermined outer diameter of the threaded bolt for screwing into the nut body, said threaded hole of said nut body having an inner diameter which is larger than the outer diameter of said core;

setting an assembly of the engaged nut body and core in a mold which has a first section for forming a synthetic resin outer layer which covers an outer periphery of said nut body, a second section for forming a front surface covering layer which covers the front surface of said nut body and a third section for forming a cap-shaped portion which covers the rear surface of said nut body;

charging molten ether resin in said mold while maintaining a termperature of said nut body and said core at 25° to 55° C., to prevent the molten resin from flowing into an annular clearance between said nut body and said core;

hardening said resin about the nut body and the free end of said core to form the cap-shaped portion at the rear surface of the nut; and unscrewing said core from said out body to form an internal threaded hole in said cap-shaped portion.

10. A method according to claim 9, wherein the temperature of said nut body and said core is 25° to 45° C.

11. A method of manufacturing a waterproof nut, comprising the steps of:

screwing a threaded core into a threaded hole of a nut body from a front surface of the nut body in such a manner that a free end of said core projects from a rear surface of said nut body, the threaded hole of the nut body having an inner diameter sufficient to threadably accept a threaded bolt having a predetermined outer diameter, said core having an outer diameter which is larger than the predetermined outer diameter of the threaded bolt for screwing into the nut body, said threaded hole of said nut body having an inner diameter which is larger than the outer diameter of said core;

setting an assembly of the engaged nut body and core in a mold which has a first section for forming a synthetic resin outer layer which covers an outer periphery of said nut body, a second section for forming a front surface covering layer which covers the front surface of said nut body and a third section for forming a cap-shaped portion which covers the rear surface of said nut body;

charging molten resin in said mold while maintaining a temperature of said nut body and said core at 5° to 110° C., to prevent the molten resin from flowing into an annular clearance between said nut body and said core, wherein said synthetic resin is selected from the group consisting of sulfone resin and sulfide resin;

hardening said resin about the nut body and the free end of said core to form the cap-shaped portion at the rear surface of the nut; and unscrewing said core from said out body to form an internal threaded hole in said cap-shaped portion.

12. A method according to claim 11, wherein the resin is a sulfone resin.

13. A method according to claim 12, wherein the temperature of said nut body in said core is 25° to 100° C.

14. A method according to claim 11, wherein the resin is a sulfide resin.

15. A method according to claim 14, wherein the temperature of said nut body and said core is 5° to 100° C.

* * * * *